United States Patent
Kumar et al.

(10) Patent No.: US 11,809,264 B2
(45) Date of Patent: Nov. 7, 2023

(54) EXOTHERMIC FAILURE PREDICTION ENGINE

(71) Applicant: Dell Products, L.P., Round Rock, TX (US)

(72) Inventors: Suren Kumar, Bangalore (IN); Thanuja C, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/656,268

(22) Filed: Mar. 24, 2022

(65) Prior Publication Data
US 2023/0305912 A1    Sep. 28, 2023

(51) Int. Cl.
*G06F 11/00*    (2006.01)
*G06F 11/07*    (2006.01)
*G06F 1/20*    (2006.01)

(52) U.S. Cl.
CPC .......... *G06F 11/0754* (2013.01); *G06F 1/206* (2013.01); *G06F 11/0721* (2013.01)

(58) Field of Classification Search
CPC ............. G06F 11/0751; G06F 11/0754; G06F 11/3447; G06F 11/3452; G06F 11/3058; G06F 1/206
See application file for complete search history.

(56) References Cited

U.S. PATENT DOCUMENTS

| | | | | |
|---|---|---|---|---|
| 10,136,558 | B2* | 11/2018 | Shabbir | H05K 7/20727 |
| 2014/0298113 | A1* | 10/2014 | Sakurai | G06F 11/2025 714/47.3 |
| 2016/0378605 | A1* | 12/2016 | Teshome | G06F 11/1417 714/36 |
| 2017/0046242 | A1* | 2/2017 | Ragupathi | G06F 11/3044 |
| 2019/0278648 | A1* | 9/2019 | Nayak | G06F 11/008 |
| 2020/0134423 | A1* | 4/2020 | Shinde | G06N 3/045 |
| 2021/0383206 | A1* | 12/2021 | Teppoeva | G06F 11/004 |
| 2022/0253337 | A1* | 8/2022 | Thapa | G06F 11/3058 |

OTHER PUBLICATIONS

Li, Cong, Cooling Anomaly Detection for Servers and Datacenters with Naive Ensemble, 2016, IEEE (Year: 2016).*
Piazza, W.J. et al., BladeCenter thermal diagnostics, 2005, IBM (Year: 2005).*
Brey, T. et al., BladeCenter chassis management, 2005, IBM (Year: 2005).*

* cited by examiner

*Primary Examiner* — Marc Duncan
(74) *Attorney, Agent, or Firm* — Fogarty LLP (57) ABSTRACT

Embodiments of systems and methods for exothermic event prediction engine are described. In an embodiment, an Information Handling System (IHS) may include: a processor, a Remote Access Controller (RAC) coupled to the processor, and a memory coupled to the RAC, the memory having program instructions stored thereon that, upon execution by the RAC, cause the RAC to collect telemetry data from the IHS and predict an exothermic failure in the IHS based, at least in part, upon the telemetry data.

20 Claims, 6 Drawing Sheets

EXOTHERMIC FAILURE PREDICTION ENGINE

FIELD

This disclosure relates generally to Information Handling Systems (IHSs), and more specifically, to systems and methods for an exothermic failure prediction engine.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Exothermic failures occur when an IHS component (e.g., a battery, a fan, a memory module, a processor, etc.) operates subject to an increased electrical current such that the accompanying increase in power dissipation raises the component's temperature beyond its operating range, thus leading to its breakdown, often in spectacular fashion (e.g., fire).

SUMMARY

Embodiments of systems and methods for an exothermic failure prediction engine are described. In an illustrative, non-limiting embodiment, an Information Handling System (IHS) may include: a processor, a Remote Access Controller (RAC) coupled to the processor, and a memory coupled to the RAC, the memory having program instructions stored thereon that, upon execution by the RAC, cause the RAC to collect telemetry data from the IHS and predict an exothermic failure in the IHS based, at least in part, upon the telemetry data.

The telemetry data may include live and/or historical telemetry. The program instructions, upon execution, may cause the RAC to compress the telemetry data into a Hardware Event Snapshot (HES). The HES may exclude duplicated telemetry data. The program instructions, upon execution, may also cause the RAC to move the HES to lower-tier storage a selected amount of time after collection.

The telemetry data may be assembled into a usage matrix including voltage and thermal readings. The voltage readings may include: a processor voltage, a memory voltage, and/or a motherboard voltage. The thermal readings may include: an inlet temperature, an outlet temperature, a target outlet temperature limit, and/or an airflow reading. The usage matrix may include an indication of at least one of: an IHS posture, or an IHS location. Moreover, the telemetry data may be collected from one or more of: the processor, a Network Interface Card (NIC), a fiber channel Host Bus Adapter (FC-HBA), a system memory, a Graphics Processing Unit (GPU), a storage drive, a Power Supply Unit (PSU), or a fan.

To predict the exothermic failure, the program instructions, upon execution, may cause the RAC to apply a Very Fast Decision Tree (VFDT) algorithm to the telemetry data. The exothermic failure may include an over-voltage or high temperature condition that causes: a processor failure, a Dual In-line Memory Module (DIMM) slot failure, a power supply failure, a battery failure, or a fan failure.

The program instructions, upon execution, may cause the RAC to scale a fan speed or modify a thermal profile of the IHS to prevent the exothermic failure. Additionally, or alternatively, program instructions, upon execution, may cause the RAC to trigger an alert in response to the prediction. The alert may be classified in a category selected from the group consisting of: a first level alert that indicates a reconfiguration of the IHS, a second level alert that indicates immediate manual intervention, and a third level alert that powers off the IHS.

In another illustrative, non-limiting embodiment, a method may include collecting telemetry data in an IHS, predicting an exothermic event in the IHS based, at least in part, upon the telemetry data, and triggering an alert in response to the prediction. The exothermic event may include a failure due to an over-voltage or high temperature condition.

In yet another illustrative, non-limiting embodiment, a hardware memory device may have program instructions stored thereon that, upon execution by a Chassis Management Controller (CMC) of a chassis comprising a plurality of IHSs, cause the CMC to collect telemetry data from the plurality of IHSs, predict an exothermic event in at least one of the plurality of IHSs based, at least in part, upon the telemetry data, and trigger an alert in response to the prediction. The exothermic event may include a DIMM slot failure due to an over-voltage or high temperature condition.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

In various embodiments, systems and methods described herein may enable the prediction of exothermic failures and/or the identification of the causes of exothermic failures in an IHS. Exothermic failures are those that occur when an IHS component (e.g., a battery, a fan, a memory module, a processor, etc.) operates subject to an increased electrical current such that the accompanying increase in power dissipation raises the component's temperature beyond its operating range, thus leading to its failure, often in spectacular fashion (e.g., fire). Exothermic failures can be particularly damaging because any given IHS component becomes more likely to fail in response to another IHS component's failing. If a chain of exothermic failures is not arrested early on, it can lead to the catastrophic failure of the entire IHS.

To address these problems, systems and methods described herein may be configured to: analyze telemetry data collected minute-by-minute by an IHS, use that data to predict the occurrence of exothermic failures in the IHS, and take corrective action at an early stage to prevent the exothermic failure. Additionally, or alternatively, these systems and methods may include alerting and providing an indication of required or suggested configuration changes to avoid the predicted exothermic failure and/or to arrest the failure at an early stage.

In various embodiments, aspects of systems and methods described herein may be implemented, at least in part, using machine learning (ML). As used herein, the terms "machine learning" or "ML" refer to one or more algorithms that implement: a neural network (e.g., artificial neural network, deep neural network, convolutional neural network, recurrent neural network, autoencoders, reinforcement learning, etc.), fuzzy logic, artificial intelligence (AI), deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of publicly available machine learning algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN.

Figure 1:
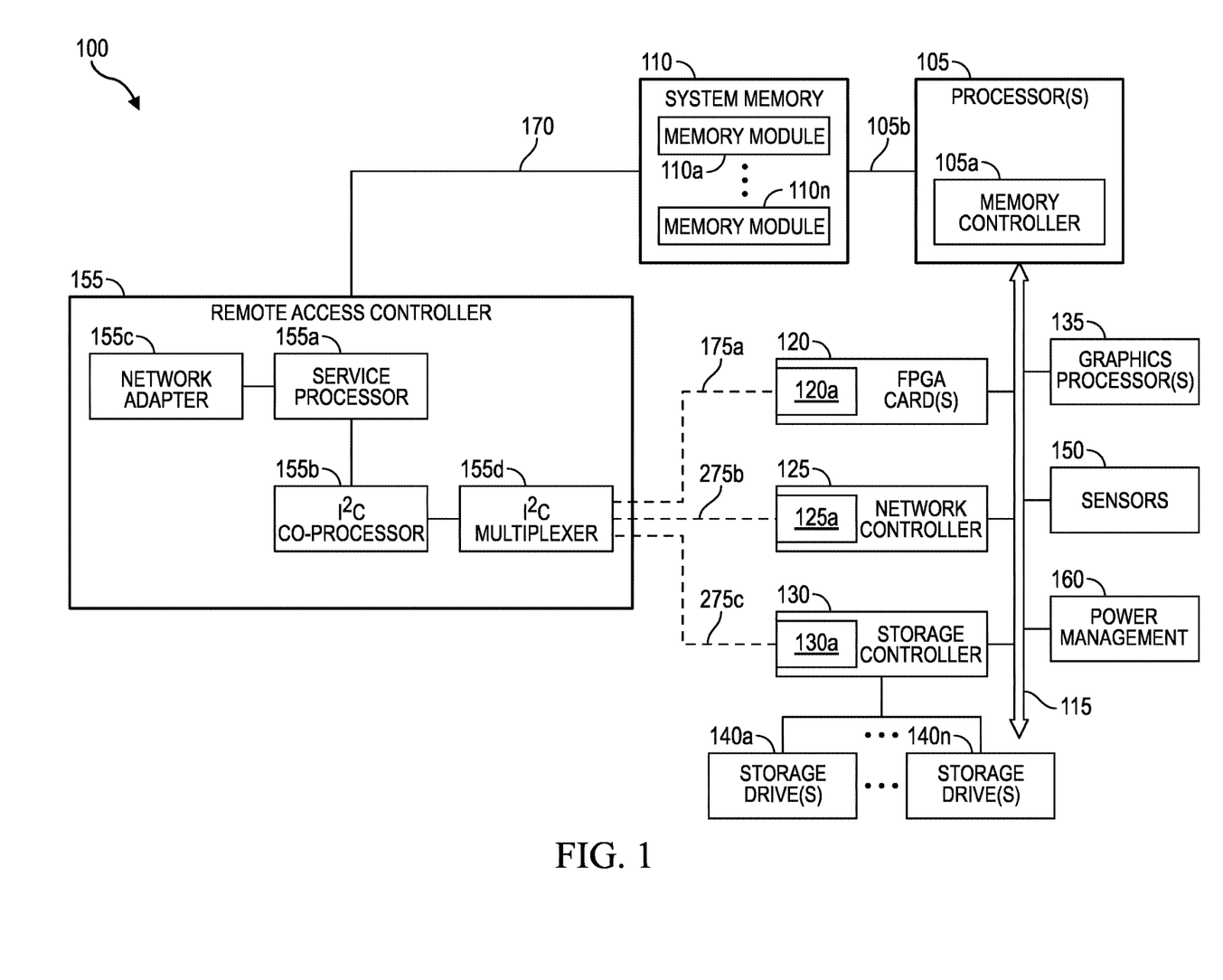
FIG. 1 is a block diagram of components of an example Information Handling System (IHS), according to some embodiments.

FIG. 1 shows example IHS 100 configured to implement systems and methods for providing an exothermic failure prediction system. For example, IHS 100 may be implemented as any desktop, laptop, or tablet computing device in the form of a client device or IHS. In some cases, IHS 100 may also be a compute sled or server, such as compute sleds 205*a-n* of FIG. 2, that may be installed within chassis 200 and which may in turn be installed within a rack. Installed in this manner, IHS 100 may utilize shared power, network and cooling resources provided by the chassis and/or rack.

IHS 100 may utilize one or more processor(s) 105. In some embodiments, processor(s) 105 may include a main processor and a co-processor, each of which may include a plurality of processing cores that, in certain scenarios, may each be used to run an instance of a server process. Also, one or more of processor(s) 105 may be graphics processing units (GPUs), for example, in scenarios where IHS 100 has been configured to support functions such as multimedia services and graphics applications.

As illustrated, processor(s) 105 include integrated memory controller 105*a* that may be implemented directly within the circuitry of processor 105. Alternatively, memory controller 105*a* may be a separate Integrated Circuit (IC) that is located on the same die as processor 105. Memory controller 105*a* may be configured to manage the transfer of data to and from system memory 110 via a high-speed memory interface 105*b*.

System memory 110 is coupled to processor(s) 105 via memory bus 105*b*. System memory 110 may be used to store computer program instructions and data executed by the processor(s) 105. Accordingly, system memory 110 may include memory components such as such as static RAM (SRAM), dynamic RAM (DRAM), NAND Flash memory, etc., or other components suitable for supporting high-speed memory operations by the processor(s) 105. In certain embodiments, system memory 110 may combine non-volatile and volatile memories.

In certain embodiments, system memory 110 may include multiple removable memory modules 110*a-n*. Each of removable memory modules 110*a-n* may correspond to a Printed Circuit Board (PCB) memory socket that receives removable memory module 110a-n, such as a DIMM (Dual In-line Memory Module), that can be coupled to the socket and then decoupled from the socket as needed, such as to upgrade memory capabilities or to replace faulty components. Other implementations of system memory 110 may be configured with one or more socket interfaces for memory modules having other form factors, such as a Dual In-line Package (DIP) memory, a Single In-line Pin Package (SIPP) memory, a Single In-line Memory Module (SIMM), and/or a Ball Grid Array (BGA) memory.

IHS 100 may utilize a chipset implemented by IC(s) that are connected to each of processor(s) 105. Alternatively, all or portions of a chipset may be implemented directly within the IC of individual processor(s) 105. The chipset may provide the processor(s) 105 with access to a variety of resources accessible via one or more buses 115. Various embodiments may utilize any number of buses to provide the illustrated pathways served by bus 115. For example, bus 115 may include a PCIe (PCI Express) switch fabric accessed via a PCIe root complex.

IHS 100 may also include one or more sensors 150. In various implementations, sensors 150 may include, but are not limited to: electric, magnetic, hall effect, radio, optical, infrared, thermal, force, pressure, touch, acoustic, ultrasonic, proximity, position, location, angle (e.g., hinge angle), deformation, bending, direction, movement, velocity, rotation, acceleration, bag state (in or out of a bag), and/or lid sensor(s) (open or closed). One or more of sensors 150 may be disposed within IHS 100, on a bezel of IHS 100, on a display, on a hinge coupling a display portion to a keyboard portion of IHS 100, or on a keyboard or other input device.

For instance, during operation of IHS 100, the user may open, close, flip, swivel, or rotate a display to produce different IHS postures. In some cases, processor(s) 105 may be configured to determine a current posture of IHS 100 using sensors 150. In a dual-display IHS implementation, when a first display (in a first IHS portion) is folded against a second display (in a second IHS portion) coupled thereto via a hinge, so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For example, in a laptop posture, a first display surface of a first display may be facing the user at an obtuse angle with respect to a second display surface of a second display or a physical keyboard portion. In a tablet posture, a first display may be at a straight angle with respect to a second display or a physical keyboard portion. And, in a book posture, a first display may have its back resting against the back of a second display or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

In other cases, processor(s) 105 may process user presence data received by sensors 150 and may determine, for example, whether an end-user is present or absent. Moreover, in situations where the end-user is present before IHS 100, processor(s) 105 may further determine a distance of the end-user from IHS 100 continuously or at pre-determined time intervals. The detected or calculated distances may be used by processor(s) 105 to classify the user as being in the IHS's near-field (user's position<threshold distance A), mid-field (threshold distance A<user's position<threshold distance B, where B>A), or far-field (user's position>threshold distance C, where C>B) with respect to IHS 100.

More generally, in various implementations, processor(s) 105 may receive and/or to produce system context information using sensors 150 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100.

As illustrated, a variety of resources may be coupled to processor(s) 105 via bus 115. For instance, processor(s) 105 may be coupled to network controller 125, such as provided by a Network Interface Controller (NIC) that allows IHS 100 to communicate via an external network, such as the Internet or a LAN. Power management and cooling unit 160 may include a plurality of Power Supply Units (PSUs), fans, and/or liquid cooling devices coupled to processor(s) 105 via bus 115. When IHS 100 is implemented as a blade or sled in a chassis, processor(s) 105 may also be coupled to power management unit and cooling unit 160 to interface with the chassis' power and/or cooling systems (e.g., components 230 and 235 in FIG. 2).

In certain embodiments, graphics processor 135 may be included within one or more video or graphics cards or controllers, installed as components of IHS 100. Additionally, or alternatively, graphics processor 135 may be integrated into Remote Access Controller (RAC) 155 and may be utilized to support the display of diagnostic and administrative interfaces related to IHS 100 via display devices that are coupled, either directly or remotely, to RAC 155.

As illustrated, IHS 100 may include one or more FPGA (Field-Programmable Gate Array) card(s) 120. Each FPGA card 120 supported by IHS 100 may include various processing and memory resources that may be reconfigured after deployment of IHS 100 through programming functions supported by the FPGA card 120. Each individual FGPA card 120 may be optimized to perform specific processing tasks, such as specific signal processing, security, data mining, and AI/ML functions, and/or to support specific hardware coupled to IHS 100.

IHS 100 may also support storage controller 130 to provide access to virtual storage configurations. For instance, storage controller 130 may provide support for RAID (Redundant Array of Independent Disks) configurations of storage devices 140a-n (e.g., as provided by storage sleds 215a-n and JBOD 255 of FIG. 2). In some embodiments, storage controller 130 may be a Host Bus Adapter (HBA).

In certain embodiments, IHS 100 may operate using a BIOS (Basic Input/Output System) that may be stored in a non-volatile memory accessible by processor(s) 105. The BIOS may provide an abstraction layer by which the Operating System (OS) of IHS 100 interfaces with hardware components. Upon powering or restarting IHS 100, processor(s) 105 may utilize BIOS instructions to initialize and test hardware components coupled to the IHS, including components permanently installed on the motherboard of IHS 100 and removable components installed in expansion slots supported by the IHS 100. The BIOS instructions may also load an OS for use by the IHS 100. In certain embodiments, IHS 100 may utilize Unified Extensible Firmware Interface (UEFI) in addition to or instead of a BIOS. Certain operations provided by a BIOS may be implemented, in full or in part, by RAC 155.

RAC 155 may operate from a different power plane from processor(s) 105 and other components of IHS 100, thus allowing RAC 155 to operate, and management tasks to proceed, while the processing cores of IHS 100 are powered off. In some embodiments, RAC 155 may perform various operations to verify the integrity of IHS 100 and its hardware components prior to initialization (i.e., in a bare-metal state). In other embodiments, RAC 155 may implement aspects of systems and methods for providing an exothermic failure prediction engine as described herein.

RAC 155 may include service processor 155a, or a specialized microcontroller, that operates management software that supports remote monitoring and administration of IHS 100. RAC 155 may be installed on the motherboard of IHS 100 or may be coupled to IHS 100 via an expansion slot provided by the motherboard. In support of remote monitoring, network adapter 125c may provide connections to RAC 155 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, RAC 155 may support monitoring and administration of various devices 120, 125, 130 of IHS 100 via a sideband interface. In such embodiments, the messages in support of monitoring and management may be implemented using MCTP (Management Component Transport Protocol) transmitted using I²C sideband bus connection 175a-c established with each of the respective managed devices 120, 125, 130. As illustrated, the managed hardware components of the IHS 100, such as FPGA cards 120, network controller 125, and storage controller 130, are coupled to processor(s) 105 via in-line bus 115, such as a PCIe root complex, that is separate from I²C sideband bus connection 175a-c.

In certain embodiments, service processor 155a may use I²C co-processor 155b to implement sideband I²C communications between the RAC 155 and managed components 120, 125, 130. I²C co-processor 155b may be a specialized co-processor or micro-controller that is configured to interface via a sideband I²C bus interface with the managed hardware components 120, 125, 130 of IHS. In some embodiments, I²C co-processor 155b may be integrated into service processor 155a, as a peripheral system-on-chip (SoC) feature provided by service processor 155a. Each I²C bus 175a-c is illustrated as single line; however, each I²C bus 175a-c may include a clock line and data line that couple RAC 155 to I²C endpoints 120a, 125a, 130a, which may be referred to as field replaceable units (FRUs).

I²C co-processor 155b may interface with individual managed devices 120, 125 and 130 via sideband I²C buses 175a-c selected through the operation of I²C multiplexer 155d. In response to switching operations by I²C multiplexer 155d, sideband bus connection 175a-c may be established by a direct coupling between I²C co-processor 155b and each individual managed device 120, 125, or 130.

To provide sideband management capabilities, I²C co-processor 155b may interoperate with corresponding endpoint I²C controllers 120a, 125a, 130a that implement the I²C communications of the respective managed devices 120, 125, and 130. Endpoint I²C controllers 120a, 125a, 130a may be implemented as a dedicated microcontroller for communicating sideband I²C messages with RAC 155. Alternatively, endpoint I²C controllers 120a, 125a, 130a may be implemented as integrated SoC functions of a processor of the respective managed device endpoints 120, 125, and 130.

As described in more detail below, IHS 100 may be used to implement compute sleds 205a-n and/or storage sleds 215a-n of chassis 200 shown in FIG. 2. Accordingly, IHS 100 may be included within a large system of similarly configured IHSs that may be housed within the same chassis, rack, and/or datacenter. In those scenarios, each RAC 155 may be configured to support automated deployment of IHSs according to configuration settings specified by an administrator.

Figure 2:
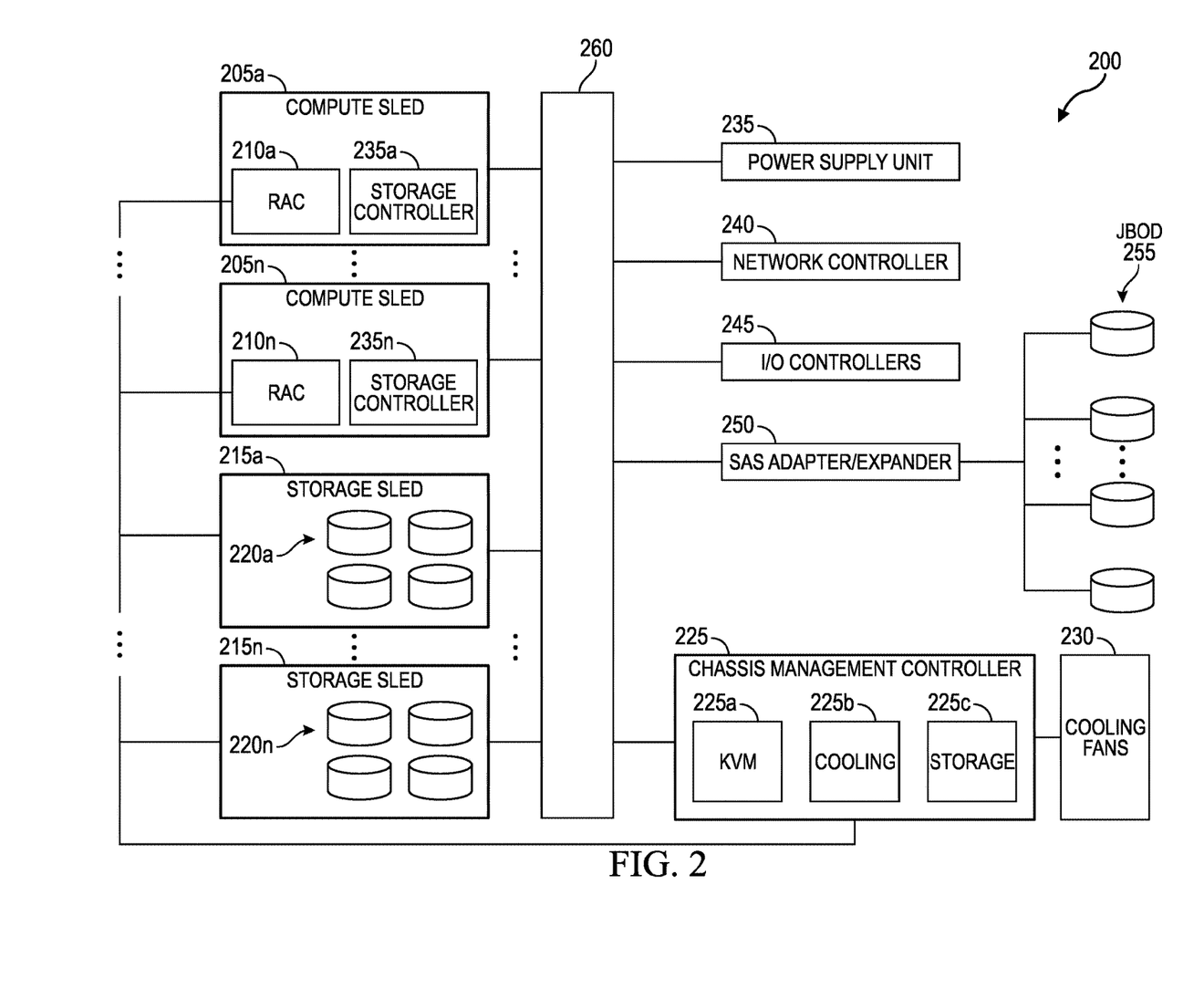
FIG. 2 is a block diagram of examples of components of a chassis configured with a plurality of IHSs, according to some embodiments.

FIG. 2 is a block diagram illustrating certain components of chassis 200 comprising one or more compute sleds 205a-n and one or more storage sleds 215a-n configured to implement systems and methods for providing an exothermic failure prediction engine. Chassis 200 may include one or more bays that each receive an individual sled (that may be additionally or alternatively referred to as a tray, blade, and/or node), such as compute sleds 205a-n and storage sleds 215a-n. Chassis 200 may support different numbers (e.g., 4, 8, 12, 24), sizes (e.g., single-width, double-width) and physical configurations of bays.

Other embodiments may include additional types of sleds that provide various types of storage and/or processing capabilities. Other types of sleds may provide power management and networking. Sleds may be individually installed and removed from chassis 200, thus allowing the computing and storage capabilities of chassis 200 to be reconfigured by swapping the sleds with different types of sleds, in many cases without affecting the operations of the other sleds.

Multiple chassis 200 may be housed within a rack. Data centers may utilize large numbers of racks, with different types of chassis installed in the various configurations of racks. The modular architecture provided by the sleds, chassis, and racks allow for certain resources, such as cooling, power, and network bandwidth, to be shared among compute sleds 205a-n and storage sleds 215a-n, thus resulting in efficiency improvements and/or greater computational capabilities.

Chassis 200 may be installed within a rack structure that provides all or part of the cooling utilized by chassis 200. For airflow cooling, a rack may include one or more banks of cooling fans that may be operated to ventilate heated air from within chassis 200 housed within the rack. Chassis 200 may alternatively or additionally include one or more cooling fans 230 that may be similarly operated to ventilate heated air from within sleds 205a-n and/or 215a-n installed within chassis 200. A rack and chassis 200 installed within the rack may utilize various configurations and combinations of cooling fans to cool sleds 205a-n and/or 215a-n and other components housed within chassis 200.

Sleds 205a-n and/or 215a-n may be individually coupled to chassis 200 via connectors that correspond to the bays provided by chassis 200 that physically and electrically couple an individual sled to backplane 260. Chassis backplane 260 may be a printed circuit board that includes electrical traces and connectors configured to route signals between the various components of chassis 200 connected to backplane 260. In various embodiments, backplane 260 may include various additional components, such as cables, wires, midplanes, backplanes, connectors, expansion slots, and multiplexers. In certain embodiments, backplane 260 may be a motherboard that includes various electronic components installed thereon. Such components installed on motherboard backplane 260 may implement all or part of the operations described herein.

In certain embodiments, one or more of compute sleds 205a-n may be IHSs 100 of FIG. 1. Compute sleds 205a-n may provide computational processing resources that may be used to support a variety of e-commerce, multimedia, business and scientific computing applications, such as services provided via a cloud implementation. Compute sleds 205a-n are typically configured with hardware and software that provide computational capabilities. Services provided using such computing capabilities may be provided as high-availability systems that operate with minimum downtime. Compute sleds 205a-n may be configured for general-purpose computing or may be optimized for specific computing tasks.

Each compute sled 205a-n includes a respective RAC 210a-n. Each RAC 210a-n provides capabilities for remote monitoring and management of compute sled 205a-n. In support of these monitoring and management functions, each RAC 210a-n may utilize both in-band and sideband (i.e., out-of-band) communications with various components of a compute sled 205a-n and chassis 200. Each RAC 210a-n may collect sensor data, such as temperature sensor readings, from components of chassis 200 in support of airflow cooling of chassis 200 and sleds 205a-n and/or 215a-n. In addition, each RAC 210a-n may implement various monitoring and administrative functions related to compute sleds 205a-n that require sideband bus connections with various internal components of the respective compute sleds 205a-n.

As illustrated, chassis 200 also includes one or more storage sleds 215a-n that are coupled to the backplane 260 and installed within one or more bays of chassis 100 in a similar manner to compute sleds 205a-n. Each of the individual storage sleds 215a-n may include different numbers and types of storage devices. For instance, storage sleds 215a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 215a-n may be utilized in various storage configurations by compute sleds 205a-n that are coupled to chassis 200.

Each of compute sleds 205a-n includes a respective one of storage controller s235a-n that may be utilized to access storage drives accessible via chassis 200. Some of storage controllers 235a-n may provide support for RAID (Redundant Array of Independent Disks) configurations of logical and physical storage drives, such as storage drives provided by storage sleds 215a-n. In some embodiments, some or all storage controllers 235a-n may be HBAs (Host Bus Adapters) that provide more limited capabilities in accessing physical storage drives provided via storage sleds 215a-n and/or via SAS expander 250.

In addition to the data storage capabilities provided by storage sleds 215a-n, chassis 200 may provide access to other storage resources that may be installed components of chassis 200 and/or may be installed elsewhere within a rack housing chassis 200, such as within a storage blade. In certain scenarios, storage resources 255 may be accessed via SAS expander 250 coupled to backplane 260 of chassis 200. SAS expander 250 may support connections to a number of JBOD (Just a Bunch Of Disks) storage drives 255 that may be configured and managed individually and without implementing data redundancy across drives 255. Additional storage resources 255 may also be at various other locations within a datacenter in which chassis 200 is installed. Additionally, or alternatively, storage resources 255 may be remotely located.

Chassis 200 includes network controller 240 that provides network access to sleds 205a-n and/or 215a-n. Network controller 240 may include various switches, adapters, controllers, and couplings used to connect chassis 200 to a network, either directly or via additional networking components and connections provided via a rack in which chassis 200 is installed. Chassis 200 may similarly include PSU(s) 235 that provide the components of chassis 200 with various levels of DC power from an AC power source or from power delivered via a power system provided by a rack within which chassis 200 may be installed. In certain embodiments, PSU(s) 235 may be implemented within a sled that may provide chassis 200 with redundant, hot-swappable PSUs.

Chassis 200 may also include various I/O controllers 240 that may support various I/O ports, such as USB ports that may be used to support keyboard and mouse inputs and/or video display capabilities. I/O controllers 245 may be utilized by Chassis Management Controller (CMC) 225 to support various KVM (Keyboard, Video and Mouse) 225a capabilities that provide administrators with the ability to interface with chassis 200.

In addition to providing support for KVM 225a capabilities for administering chassis 200, CMC 225 may support various additional functions for sharing the infrastructure resources of chassis 200. In some scenarios, CMC 225 may implement tools for managing power 235, network bandwidth 240, and airflow cooling 230 available in chassis 200. As described, airflow cooling 230 may include an airflow cooling system that is provided by a rack in which chassis 200 may be installed and managed by cooling module 225b of CMC 225.

In the illustrated embodiment, chassis management controller 225 includes storage module 225c that provides capabilities for managing and configuring certain aspects of the storage devices of chassis 200, such as the storage devices provided within storage sleds 215a-n and within JBOD 255. Each of storage controllers 235a-n may be used to implement various types of virtual storage configurations, such as RAID configurations, using the storage devices provided by chassis 200. Accordingly, chassis 200 may support large numbers of combinations of different storage devices that may be configured in various types of storage profiles.

In other embodiments, CMC 225 may further implement aspects of systems and methods for providing an exothermic failure prediction engine as described herein.

Storage module 225c of CMC 225 may support requests for storage configurations by each of storage controllers 235a-n by selecting and mapping storage devices from those available within chassis 200, and in certain embodiments, from those available in any other similarly configured chassis that can be accessed by CMC 225.

Storage module 225c may also be configured to manage all unmapped storage devices of chassis 200 as a global pool of spare storage devices that may be used to support the storage configurations operated by each of storage controllers 235a-n. In this manner, CMC 225 may provide administrators with the ability to set up virtual storage configurations using all shared storage resources that are available within chassis 200, or within other accessible chassis.

In other embodiments, IHS 100 and chassis 200 may not include all the components shown in FIGS. 1 and 2. In other embodiments, IHS 100 and chassis 200 may include other components in addition to those that are shown in FIGS. 1 and 2. Furthermore, some components that are represented as separate components in FIGS. 1 and 2 may instead be integrated with other components. For example, all or a portion of the operations executed by the illustrated components may instead be provided by components integrated into one or more processor(s) as an SoC or the like. For example, IHS 100 may be implemented as different classes of computing devices including, but not limited to: servers, workstations, desktops, laptops, appliances, video game consoles, tablets, smartphones, etc.

Figure 3:
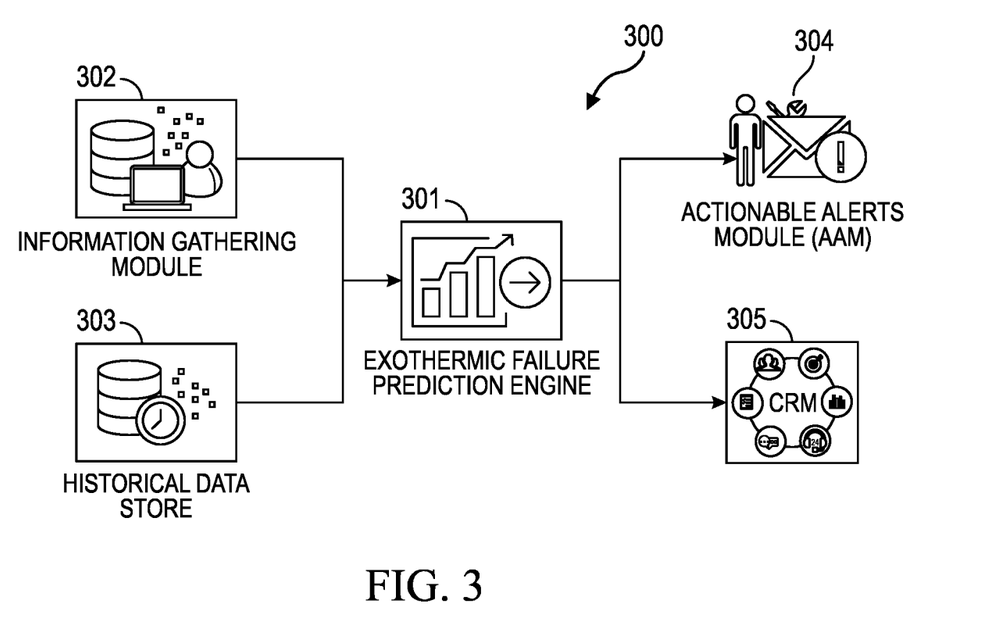
FIG. 3 is a block diagram of an example of an exothermic failure prediction system, according to some embodiments.

FIG. 3 is a block diagram of an example of exothermic failure prediction system 300. In various embodiments, each of components 301-305 may be instantiated through the execution of program instructions by one or more IHSs 100. In some cases, one or more of components 301-305 may be implemented by RAC 155. Additionally, or alternatively, one or more of components 301-305 may be implemented by CMC 225.

In operation, exothermic failure prediction engine 301 receives live telemetry data from information gathering module 302 and/or historical telemetry data from historical data store 303. Examples of telemetry data include, but are not limited to: a processor voltage, a memory voltage, and a motherboard voltage, an inlet temperature, an outlet temperature, a target outlet temperature limit, an airflow reading, etc. In some cases, the telemetry data may also include other contextual information indicative of an IHS posture or location. Such telemetry data may be collected, for example, from one or more of: the processor, a Network Interface Card (NIC), a fiber channel Host Bus Adapter (FC-HBA), a system memory, a Graphics Processing Unit (GPU), a storage drive, a Power Supply Unit (PSU), a fan, etc.

Once telemetry data is collected, information gathering module 302 creates a Hardware Event Snapshot (HES), which captures and compiles an IHS usage matrix using the telemetry data. Each HES comprises telemetry data collected at a regular time intervals (e.g., minute-by-minute, or other selected interval) that is usable to analyze the state of the IHS and stored in historical data store 303. Because HES data can be voluminous, a master HES record may be created that compresses and decompresses the IHS usage matrix data for efficient storage, for example, by eliminating redundant telemetry entries across HESs and/or using different tiers of storage devices (most recent data stored in faster or more expensive storage devices and least recent data stored in slower or less expensive storage devices).

Exothermic failure prediction engine 301 applies the telemetry data to an ML model, such as a VFDT algorithm trained to predict exothermic failures. In response to a positive prediction, Actionable Alerts Module (AAM) 304 may issue actionable alerts, which may indicate corrective configuration changes to prevent the occurrence of the predicted exothermic failure. Examples of configuration changes may include, but are not limited to: scaling up/down a fan speed, modifying an IHS's thermal, power, or performance profile, etc.

In some cases, AAM 304 may indicate that a predicted exothermic failure requires manual intervention along with a detailed analysis. For example, if a DIMM power usage matrix has a fluctuation where power usage readings are out of specification, AAM 304 may recommend a physical inspection of the DIMM component segment where the failure is predicted. Likewise, for each component at risk of exothermic failures, a detailed analysis and recommendation may be provided in a pro-active manner to help avoid exothermic failures and/or arrest chains of exothermic failures in early stages. Additionally, or alternatively, in response to a positive prediction by engine 301, Customer Relationship Management (CRM) system 305 may issue a support ticket or the like.

Figure 4:
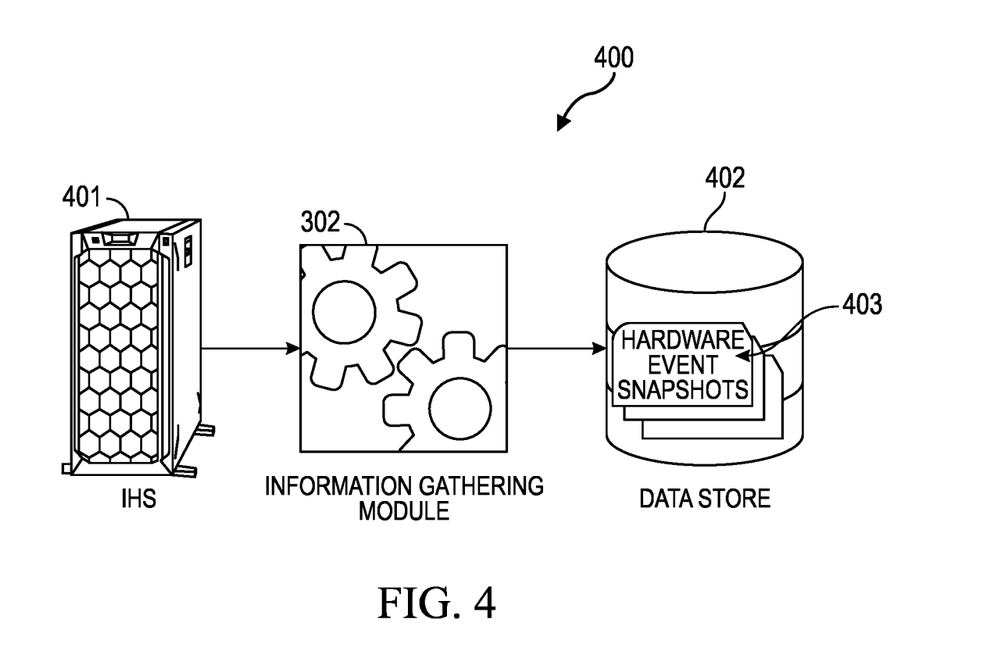
FIG. 4 is a block diagram of an example of an information gathering system, according to some embodiments.

FIG. 4 is a block diagram of an example of information gathering system 400. In some embodiments, information gathering system 400 may be used to illustrate the operation of information gathering module 302. Particularly, information gathering module 302 implements a preparatory stage which by default enables advanced telemetry data streaming with RAC 155 (or CMC 225) for all components of IHS 401 (e.g., IHS 100, compute sleds 105a-n of chassis 200, chassis 200, etc.) to capture their live telemetry data, specifically power and thermal metrics, at regular time intervals and stored as HESs 403 in data store 402.

Each HES may include voltage and thermal metrics from different rails or buses of various IHS components (e.g., NIC, FC HBA, CPU, memory, fans, PSUs, etc.). An example of an HES is shown in Table I below:

TABLE I

| Telemetry Data Item | System Usage Matrix |
|---|---|
| CPU1 FIVR PG | 5 V |
| CPU1 MEM012 VDDQ PG | 12 V |
| CPU1 MEM012 VPP PG | 12 V |
| CPU1 MEM012 VR | 5 V |
| CPU1 MEM012 VTT PG | 2.6 V |
| CPU1 MEM345 VDDQ PG | 3 V |
| CPU1 MEM345 VPP PG | 1.8 V |
| CPU1 MEM345 VR | 3 V |
| CPU1 MEM345 VTT PG | 2 V |
| CPU1 VCCIO PG | 2.8 V |
| CPU1 VCORE PG | 3 V |
| CPU1 VCORE VR | 5 V |
| CPU1 VSA PG | 3.8 V |
| System Board 1.8 V SW PG | 1.8 V |
| System Board 12 V BP PG | 12 V |
| System Board 12 V PCIE PEM PG | 12 V |
| System Board 12 V PCIE PG | 12 V |
| System Board 12 V fan PG | 12 V |
| System Board 2.5 V SW PEM PG | 2.5 V |
| System Board 2.5 V SW PG | 2.5 V |
| System Board PS1 PG | 3 V |
| System Inlet Temperature | 17° C. |
| System Exhaust Temperature | 20° C. |
| Net System Airflow | 104 CFM |
| Target Exhaust Temperature Limit | 70° C. |

Additionally, or alternatively, an HES may include usage statistics from NICs, GPUs, storage devices, CPUs, memories, PSUs, etc. Additionally, or alternatively, an HES may include contextual information such as an indication of an IHS posture or an IHS location at the time of collection. In some implementations, HESs captured from different RACs 155 and/or CMC 225 for different IHSs 100 (e.g., different sleds 205a-205n) may be moved to data store 402 in parallel.

Figure 5:
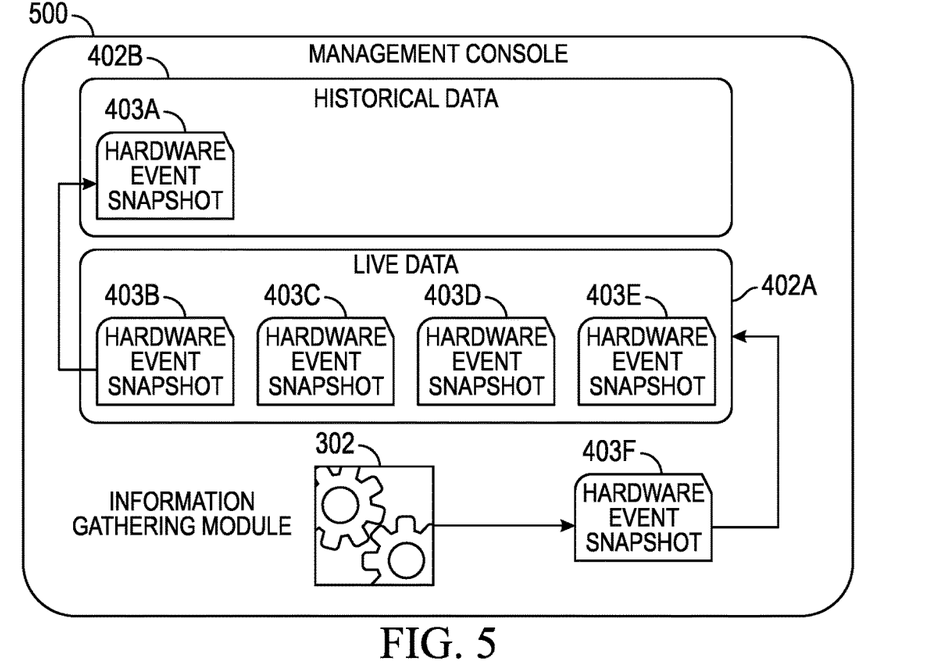
FIG. 5 is a block diagram of an example of a management console, according to some embodiments.

FIG. 5 is a block diagram of an example of management console 500. In some embodiments, management console 500 may be executed by RAC 155, RACs 210a-n, or CMC 225, and it may be usable to process and store HESs or other telemetry data. In operation, management console 500 may receive telemetry data from information gathering module 302 in the form of HESs 403A-F.

In this example, HES 403A may be the first collected HES, such that management console 500 has moved it to historical portion 402B of data store 402 (e.g., historical data store 303) a selected amount of time after its collection. HESs 403B-E are subsequently collected HESs that management console 500 maintains in live portion 402A of data store 402 until sufficient time has passed, after which they too can be moved to historical portion 402B. HES 403F is the latest HES collected and is storable in live portion 402A of data store 402. Because exothermic failures are not incidental events, minute-by-minute changes in an IHS component over the period of observation are often required for effective prediction.

Figure 6:
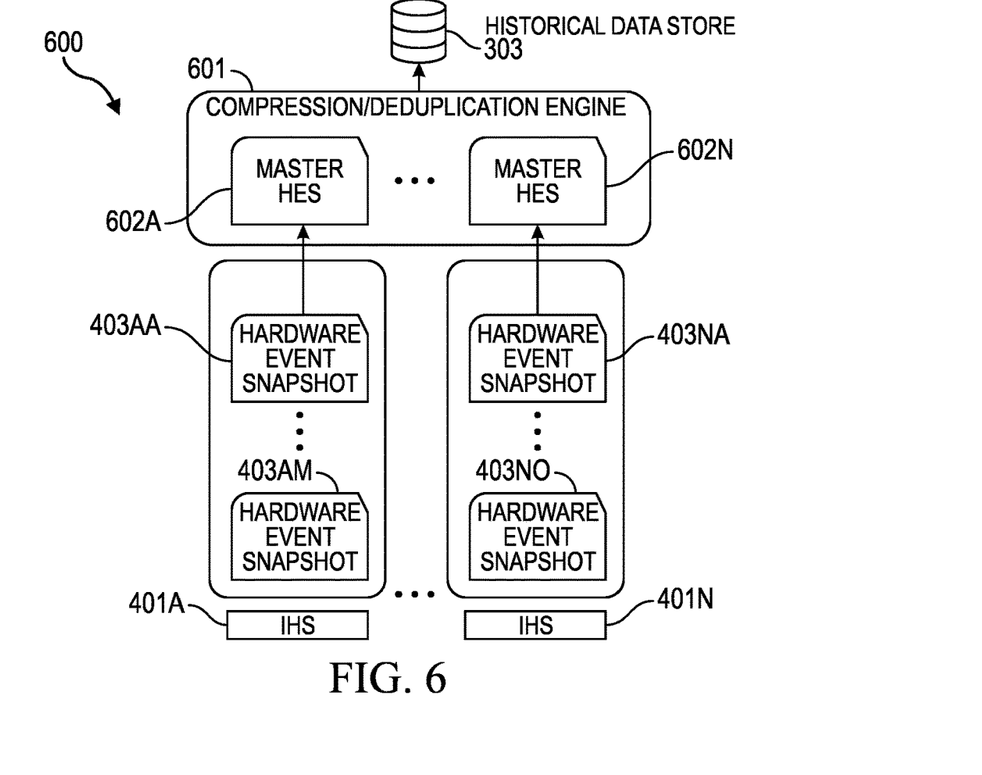
FIG. 6 is a block diagram of an example of a record storage system, according to some embodiments.

FIG. 6 is a block diagram of an example of record storage system 600. In some embodiments, record storage system 600 may include compression/deduplication engine 601 configured to produce master HES records 602A-N for HESs 403AA-AM through 403NA-O collected by IHSs 401A through 401N, respectively, and to store them in historical data store 303.

In operation, compression/deduplication engine 601 may compress, decompress, and/or deduplicate the IHS's usage matrix data. For example, if the power and thermal metrics of various components is same for a selected amount of time (e.g., several weeks, months, or years), a master HES 602A-N may be produced where all duplicate data is compressed or deleted. In some cases, compression or deduplication may be performed differently (e.g., different algorithms, parameters, etc.) in different contexts (e.g., depending upon the IHS's posture, location, etc.).

Figure 7:
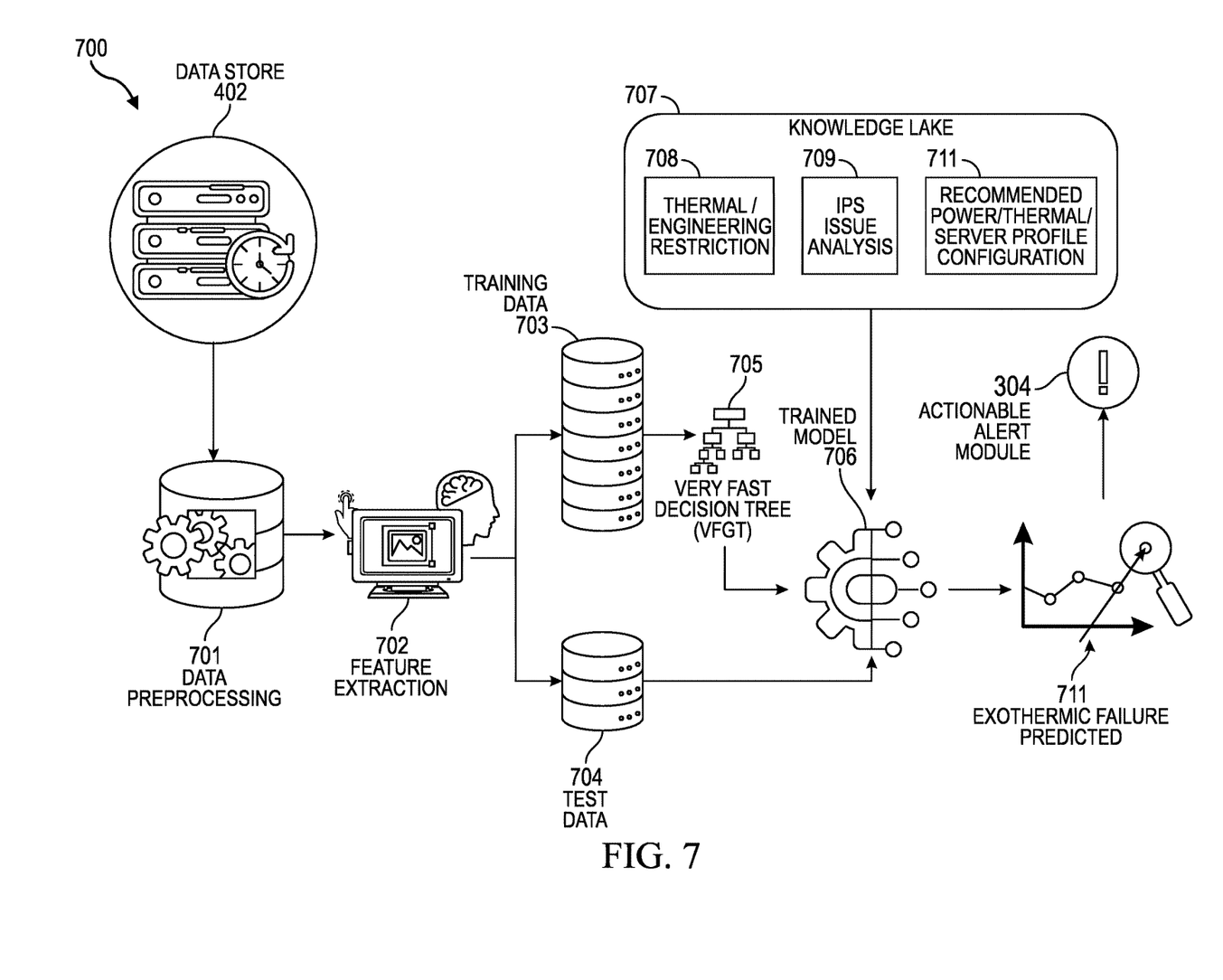
FIG. 7 is a flowchart of an example of a method for operating an exothermic failure prediction engine, according to some embodiments.

FIG. 7 is a flowchart of an example of method 700 for operating exothermic failure prediction engine 301. In various embodiments, method 700 may be performed by RAC 155 or CMC 225 upon instantiation of exothermic failure prediction engine 301. Method 700 may predict exothermic failures in IHSs 100 or chassis 200 prior to their occurrence, and can alert an IHS administrator, for example, to take necessary action by arresting the failure at an early stage.

At 701, HES and historical data stored in datastore 402 may be pre-processed and labeled for processing by a VFDT model. Various data pre-processing methods such as vectorization, normalization, and handling missing values may be used to convert the collected raw data into a meaningful data. At 702, feature extraction techniques may be used for reducing the number of features from the original features set to ease the model's complexity and overfitting, to enhance the model's computation efficiency, and/or to reduce generalization errors.

In method 700, the fine-tuned data is divided into training data 703 and test data 704. Training data 704 may be used to train VFDT model 705 into trained model 706. Conversely, test data 704 may include new data where output values are withheld from VFDT model 705. Predictions from trained model 706 using test data 704 are gathered and compared against the withheld output values for testing purposes.

Once method 700 produces trained model 706, trained model 706 may be used to predict exothermic failures at 711. In some cases, additional data input into trained model 706 may include knowledge lake 707, which in turn includes thermal or engineering restrictions 708, intrusion prevention system (IPS) issue analysis data 709, and power/thermal server profile configuration recommendations 710. Once the exothermic failure is predicted at 711, based on the certainty or probability of failure linked with each prediction, AAM 304 may identify an appropriate recommendation or remediation.

Figure 8:
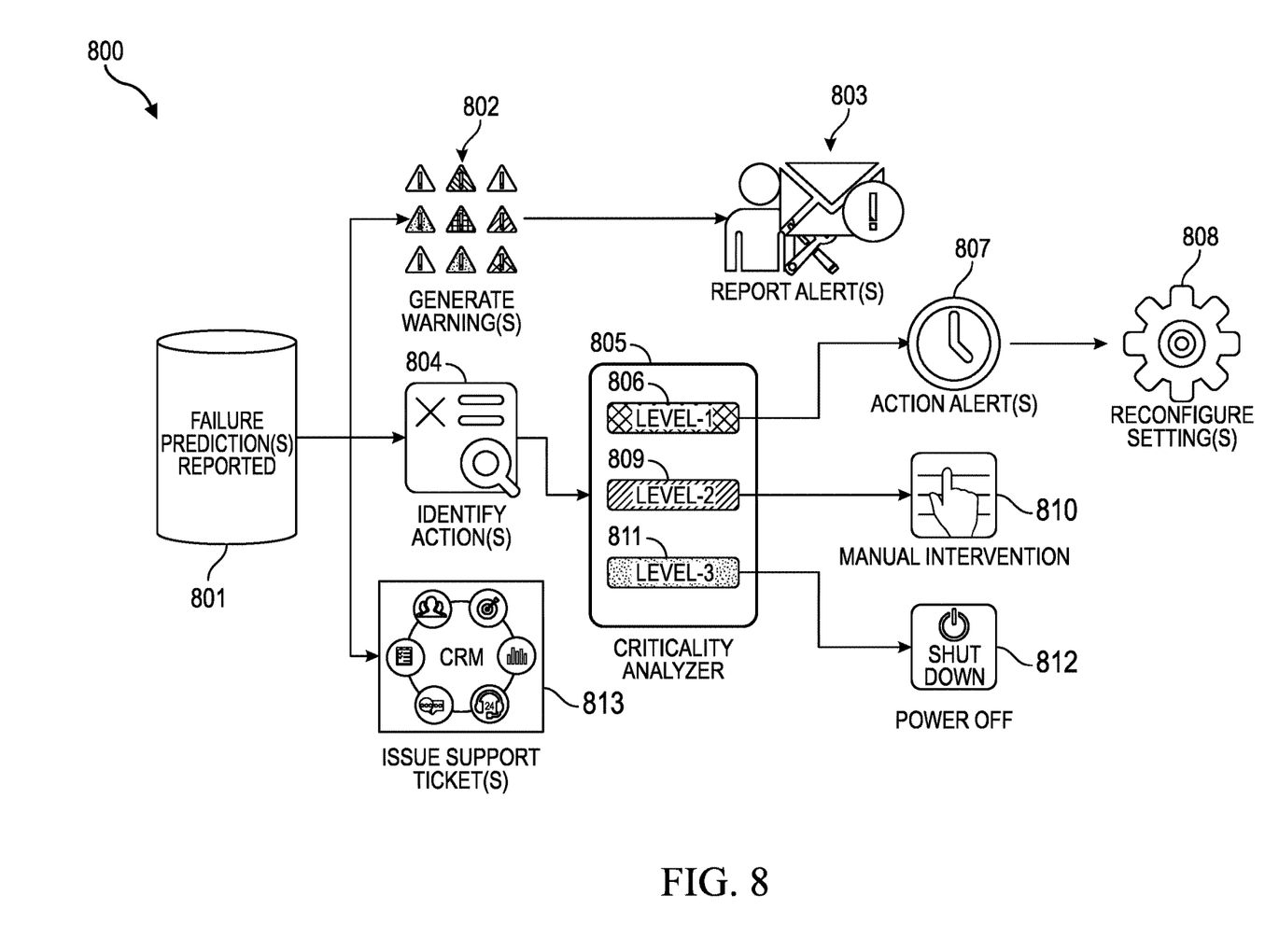
FIG. 8 is a flowchart of an example of a method for providing actionable alerts, according to some embodiments.

FIG. 8 is a flowchart of an example of method 800 for providing actionable alerts. In some embodiments, method 800 may be performed by RAC 155 or CMC 225 upon instantiation of AAM 304. At 801, AAM 304 receives an exothermic failure prediction report from exothermic failure prediction engine 301. Then, at 802 AAM 304 generates one or more warning(s), at 804 AAM 304 identifies one or more remedial action(s), and/or at 813 AAM 304 issues a support ticket to an IT administrator.

For example, after AAM 304 generates one or more warning(s) at 802, AAM 304 may produce the alert in one or more interfaces (e.g., a visual warning displayed on a display of the IHS, an audible sound, an email, a text, or a message transmitted to an ID administrator, etc.).

Additionally, or alternatively, after AAM 304 identifies one or more remedial action(s) at 804, criticality analyzer 805 may classify the severity of the alert into level-1 806, level-2 809, or level-3 811 based on a policy. If the predicted exothermic failure is least severe, at 807 method 800 may issue an alert to the user or IT administrator and, upon the user's approval, it may reconfigure one or more IHS settings (e.g., a thermal profile, a fan speed, a maximum processor speed, etc.) to prevent or delay the predicted failure.

If the predicted exothermic failure is moderately severe, method 800 may require manual intervention from the user or IT administrator at 810 (e.g., inspecting, removing, replacing a memory module from a particular DIMM slot, etc.). If the predicted exothermic failure is most severe, method 800 may power the IHS down of off at 812.

Systems and methods described herein may provide techniques for analyzing an IHS's live and historical usage matrix of telemetry data to predict exothermic failures in the IHS and to provide actionable alerts with corrective configuration changes to prevent these failures. These systems and methods may be used to create an instance of IHS usage using a Hardware Event Snapshot (HES) that captures all usage matrix data, such as voltage, power, thermal, sensor readings at a given point in time. Then, these systems and methods may create a master Hardware Event Snapshot (Master HES) to compress and decompress the IHS's usage matrix data collected at regular intervals for efficient storage usage.

As such, these systems and methods may be used to save hardware costs. An exothermic failure not only damages the component subject to it, but also damages the surrounding hardware which leads to a higher cost to replace all the damaged hardware. Moreover, these systems and methods may also be used to save other resources. For example, for each exothermic failure that happens in the field, a team of technical experts along with customer support personnel perform extensive failure analysis to identify and prevent the issue in future.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor;
a Remote Access Controller (RAC) coupled to the processor; and
a memory coupled to the RAC, the memory having program instructions stored thereon that, upon execution by the RAC, cause the RAC to:
collect telemetry data from the IHS;
predict an exothermic failure in the IHS based, at least in part, upon the telemetry data;
compress the telemetry data into a Hardware Event Snapshot (HES); and
move the HES to lower-tier storage a selected amount of time after the collection.

2. The IHS of claim 1, wherein the telemetry data comprises live telemetry.

3. The IHS of claim 1, wherein the telemetry data comprises historical telemetry.

4. The IHS of claim 1, wherein the HES excludes duplicated telemetry data.

5. The IHS of claim 1, wherein the telemetry data is assembled into a usage matrix comprising voltage and thermal readings.

6. The IHS of claim 5, wherein the voltage readings comprise: a processor voltage, a memory voltage, and a motherboard voltage.

7. The IHS of claim 5, wherein the thermal readings comprise: an inlet temperature, an outlet temperature, a target outlet temperature limit, and an airflow reading.

8. The IHS of claim 5, wherein the usage matrix comprises an indication of at least one of: an IHS posture, or an IHS location.

9. The IHS of claim 1, wherein the telemetry data is collected from one or more of: the processor, a Network Interface Card (NIC), a fiber channel Host Bus Adapter (FC-HBA), a system memory, a Graphics Processing Unit (GPU), a storage drive, a Power Supply Unit (PSU), or a fan.

10. The IHS of claim 1, wherein to predict the exothermic failure, the program instructions, upon execution by the RAC, further cause the RAC to apply a Very Fast Decision Tree (VFDT) algorithm to the telemetry data.

11. The IHS of claim 1, wherein the exothermic failure comprises an over-voltage or high temperature condition that causes: a processor failure, a Dual In-line Memory Module (DIMM) slot failure, a power supply failure, a battery failure, or a fan failure.

12. The IHS of claim 1, wherein the program instructions, upon execution by the RAC, further cause the RAC to scale a fan speed or modify a thermal profile of the IHS to prevent the exothermic failure.

13. The IHS of claim 1, wherein the program instructions, upon execution by the RAC, further cause the RAC to trigger an alert in response to the prediction.

14. The IHS of claim 13, wherein the alert is classified in a category selected from the group consisting of: a first level alert that indicates a reconfiguration of the IHS, a second level alert that indicates immediate manual intervention, and a third level alert that powers off the IHS.

15. A method, comprising:
    collecting telemetry data in an Information Handling System (IHS); and
    predicting an exothermic event in the IHS based, at least in part, by applying a Very Fast Decision Tree (VFDT) algorithm to the telemetry data.

16. The method of claim 15, wherein the exothermic event comprises a failure due to an over-voltage or high temperature condition.

17. The method of claim 15, further comprising:
    compressing the telemetry data into a Hardware Event Snapshot (HES); and
    moving the HES to lower-tier storage a selected amount of time after the collection.

18. A hardware memory device having program instructions stored thereon that, upon execution by a Chassis Management Controller (CMC) of a chassis comprising a plurality of Information Handling Systems (IHSs), cause the CMC to:
    collect telemetry data from the plurality of IHSs; and
    predict an exothermic event in at least one of the plurality of IHSs based, at least in part, upon application of a Very Fast Decision Tree (VFDT) algorithm to the telemetry data.

19. The hardware memory device of claim 18, wherein the exothermic event comprises a Dual In-line Memory Module (DIMM) slot failure due to an over-voltage or high temperature condition.

20. The hardware memory device of claim 18, wherein the program instructions, upon execution by the CMC, further cause the CMC to:
    compress the telemetry data into a Hardware Event Snapshot (HES); and
    move the HES to lower-tier storage a selected amount of time after the collection.

* * * * *